Jan. 25, 1966    J. HENRY-BAUDOT    3,231,773
INDUCTOR WINDINGS FOR ROTARY MACHINES
Filed Jan. 21, 1960    3 Sheets-Sheet 1

Inventor:
Jacques Henry-Baudot
By Kenyon, Palmer and Stewart

Jan. 25, 1966  J. HENRY-BAUDOT  3,231,773
INDUCTOR WINDINGS FOR ROTARY MACHINES
Filed Jan. 21, 1960  3 Sheets-Sheet 3

Inventor:
Jacques Henry-Baudot
By Kemon, Palmer and Stewart

United States Patent Office 3,231,773
Patented Jan. 25, 1966

3,231,773
INDUCTOR WINDINGS FOR ROTARY MACHINES
Jacques Henry-Baudot, Antony, France, assignor to Printed Motors Inc., New York, N.Y.
Filed Jan. 21, 1960, Ser. No. 3,769
Claims priority, application France, Feb. 27, 1959, 788,045
9 Claims. (Cl. 310—268)

The present invention concerns improvements in or relating to electric rotary machines, specially of the axial airgap kind, wherein the inductor windings are made of flat conductors intimately secured to an insulating carrier sheet, such windings being advantageously produced by well-known and so-called "printed circuitry" techniques.

The invention is more specifically concerned with such inductor windings the patterns of which are in the form of sectoral turns for defining pole areas. It is an object of the invention to vary the shape and distribution of certain portions of the winding conductor as to obtain predetermined waveforms of the magnetic field they induce in these pole areas, to obtain either a fair approximation of a sine waveform for this field or, on the other hand, a field distribution of any distorted degree with respect of such a sine waveform.

According to the present invention, the magnetic poles are formed by a flat-conductor winding consisting of a series of single-layer coils spaced apart along a path or line along which the pole areas are to be distributed. Such path or line may be called the axis of distribution of the pole areas, see, for example, the circular path axis marked APD in FIGURE 5B. Each coil has an axis of symmetry AS passing through the center of its pole area transversely of said pole distribution axis APD, and the transverse conductor portions on each coil having different widths which vary symmetrically on opposite sides of said axis of symmetry, to produce a predetermined magnetic field distribution in each pole area.

The invention will be fully explained with reference to the accompanying drawings, wherein.

Figure 3:
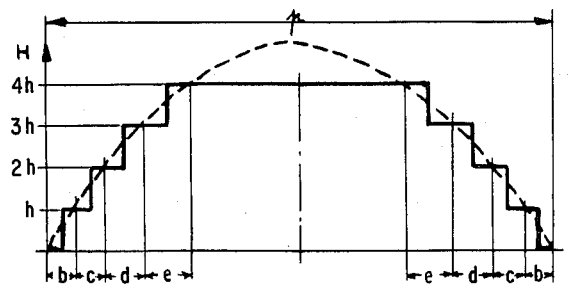
FIG. 3 shows a graph to compare with that of FIG. 2, for defining a law of determination of respective widths of the same number of flat conductors in order to better approximate the sine-wave form of the magnetic flux distribution in the pole area.
Figure 4:
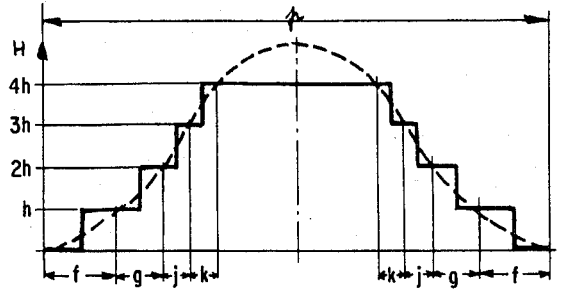
FIG. 4 shows a graph to compare with those of FIGS. 2 and 3, for defining a law of determination of respective widths of the same number of flat conductors as before in order to closely approximate another waveform of magnetic field which is quite arbitrarily choosen in view of better disclosing the adaptability of the invention.
Figures 5A, 5B:
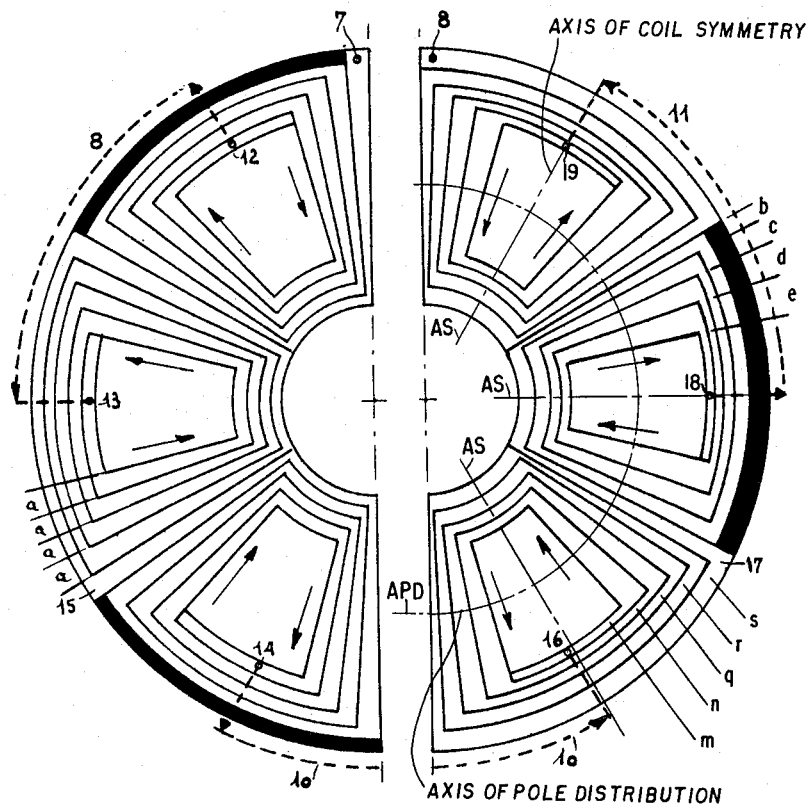
FIGS. 5A and 6A show views of half-windings of flat conductors which heretofore have been used in the stator of the machine of FIG. 1.
Figures 6A, 6B:
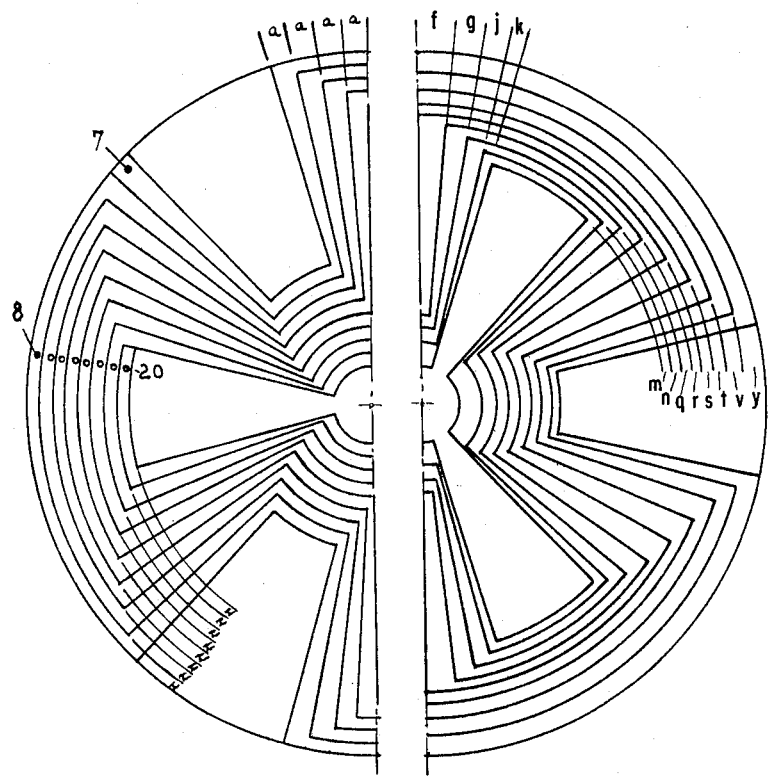

FIGS. 5B and 6B respectively show modifications according to the invention, of the winding conductors of FIGS. 5A and 6A; FIG. 5B has the winding modeled in accordance with the low of FIG. 3, and FIG. 6B, in accordance with the law of FIG. 4;

Graphs of FIGS. 3 and 4 are only illustrative examples. So are the winding patterns of FIG. 5B and 6B as they imply an identical distribution of the magnetic field at any and all value of radius. It will be further demonstrated that the invention may also be applied to cases where the magnetic field waveform may further be varied along each radius.

Figure 1:
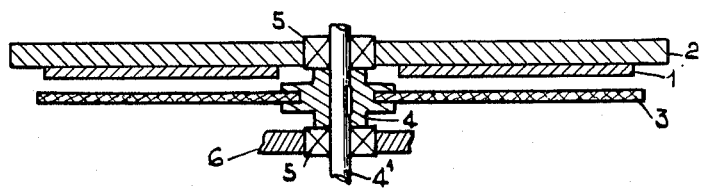
FIG. 1 is a cross-section of a simplified structure of multipolar machine of axial airgap kind.

The machine of FIG. 1 comprises a stator inductor winding 1 on a disk-shaped base plate 2, and an armature disk-shaped member 3 mounted on a shaft $4^1$ through a hub 4. Shaft $4^1$ is journalled in two bearings 5, one bearing being mounted on the base plate 2, and the other mounted on a further base plate arranged on the other side of the rotor armature, and a part of which is shown at 6. The winding of the stator member is made of flat conductors "printed" on a thin insulating sheet applied over a ring of magnetic material affixed to the base plate 2. In a modification, the winding may be formed over a ring of both magnetic and insulating material without any interposition of a dielectric sheet. For the sake of simplicity, the winding is considered a single-phase one, though it may have two or three phases if required.

Such a stator winding may have a coil pattern either in accordance with that shown in FIG. 5A or that shown in FIG. 6A. These figures both show a six-pole winding having six pole coils equally distributed along a circular line or axis. Each coil has four turns, eight radial conductor portions, four on each side of the pole area to be delineated. These radial conductor portions are contiguous and substantially of a sectoral shape and are interconnected by means of arcuate conductor portions which are parallel with the pole distribution axis. In FIG. 5A the pattern obtained is in the form of flat sectoral coils while in FIG. 6A, the winding is a spiral of several turns, each formed of several sectoral loops or open-ended coil turns.

Referring to the pattern shown in FIG. 5A, the input terminal to the winding is shown at 7 for a first coil. The direction of the current in the inductor winding is indicated by arrows. As shown, the current flows from the terminals 7 up to a mid through-connection 12 leading to the rear face of the carrier. In both FIGS. 5A and 6A, the insulating portions are shown in solid black, so that the conductors are thus delineated by insulating lines. Such a representation actually corresponds to the drawing of the winding on a transparent sheet for the photo-etching process as used in printed circuit techniques.

On the rear face is provided an arcuate connection shown in dotted lines at 9 from which the current is led to the through-connection 13 to the second coil wherein the current flows in a direction opposite to the flow in the first coil and according to the arrows. The outer arcuate conductor of this second coil directs the current to the input conductor 15 of the next coil, which passes the current in the same direction as in the first coil up to a through-connection 14. On the rear face, an arcuate connection 10 shown in dotted lines receives this current and passes it on to the next coil, and so forth (the complete progression may be followed by then considering FIG. 5B which shows the other half of the winding but with conductors shaped therein according to the invention).

Similarly, FIG. 6A shows a known type of winding while FIG. 6B shows the same type of winding but modified in accordance with the present invention.

Referring to the winding pattern shown in FIG. 6A, the current flows from conductor 7 positioned in the outermost spiral turn, through this turn which extends entirely around the inductor member, and through all the other turns which are connected in series right up to the point 20 on the innermost spiral turn. At this point the current is transferred to a rear face connection shown in dotted lines at 8.

In both FIGS. 5A and 6A, the width angular span $a$ of the radial conductor portions has a single value for all conductors. Similarly, each arcuate conductor portion is of a uniform radial height $x$.

This coverage of winding ensured by radial and sectoral conductor portions which are made substantially contiguous may be considered as the optimum from the energetic efficiency point of view. However it is the distribution of the turns in the coverage area which controls the actual waveform of the magnetic field in the pole areas free from conductors and consequently controls the spatial distribution of the magnetic flux in the machine.

Figure 2:
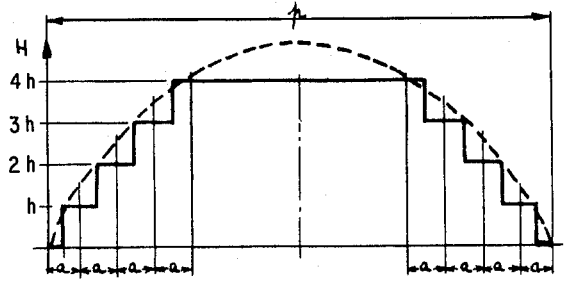
FIG. 2 shows a distribution of magnetic field obtained with flat conductors of same width as in FIGS. 5A and 6A, as compared to a purely sine-waveform distribution.

Graphs of FIGS. 2, 3 and 4 will be considered in this respect. Each graph is slotted for an arbitrary radius along which and transversely to which the polar pitch is equal to $p$, which is the length of the arc between the two radii delineating an inductor pole in the machine. The axis of abscissae represents the development in a straight line. The axis of ordinates represents the intensity of the magnetic field generated by that part of the winding in the same arc. Four conductors being considered, and as the electrical current is of the same value in all conductors, four ordinates $h$, $2h$, $3h$ and $4h$ are shown for representing the additive actions of the said conductors. In dash line is shown the ideal or desired waveform for the magnetic field. The stepped curve in full line represents the actual and approximate waveform as obtained in the machine.

FIG. 2 shows the graph obtained for the shape and distribution of conductors as in either FIG. 5A or FIG. 6A. The angular widths of the radial conductor portions at the concerned radius all equal $a$. The actual waveform is obtained by first erecting lines normal to the mid-points of the spans $a$ marked on the axis of abscissae, then taking the intersection points of the said lines with lines drawn parallel to the axis of abscissae and having ordinates values of $h$, $2h$, $3h$ and $4h$, and finally drawing the stepped M.M.F. waveform to fit in with such intersection points. Quite obviously, there is no relation between the thus obtained waveform curve and the required sine wave-form indicated in dash line. The approximation is not good as is apparent from the drawing.

On the other hand, and according to the invention, the ideal waveform can be more closely approached if the widths of the conductors are determined with respect to the ideal waveform to be approximated. This is obtained by first taking the intersection points of said ideal waveform curve with lines of ordinates $h$, $2h$, $3h$ and $4h$, then drawing lines from these intersection points perpendicular to and crossing the axis of abscissae. The thus obtained intersection points on the abscissae axis designate mid-points of the transfer conductor spans, at the concerned radius. On the graph of FIG. 3, the ideal waveform to be approximated is a sine waveform and the conductor spans or widths thus obtained are $b$, $c$, $d$ and $e$. Comparison of the actual waveform of FIGS. 2 and 3 clearly shows the improvement of waveform obtained according to the invention. But, as the invention contains further possibilities, an arbitrary wave-form is considered as a further example in FIG. 4. From the same method as for FIG. 3, the conductor spans obtained for approximating this arbitrary waveform are then shown at $f$, $g$, $j$ and $k$.

When it is considered that the same relative spans of conductors are maintained at any radius, viz. each radial conductor portion has a sectoral shape, that is, the relative spans as above defined are valid both for the widths and angular flares of the radial conductors, one obtains the winding pattern of FIGS. 5B and 6B for the respective applications of the results from the graphs of FIGS. 3 and 4.

The pattern of FIG. 5B complements that of FIG. 5A with respect to the coil interconnections: the rear connection 10 reaches the through-connection 16 of the first coil of FIG. 5B and the outer arcuate conductor of said first coil leads the current to the second coil, input conductor 17 thereof, and the through-connection 18 of said second coil is connected through the rear connection 11 to the input 19 of the last coil.

On both FIGS. 5B and 6B, it is further shown that the arcuate conductors are not maintained at a uniform radial height or width $x$ as they were in FIGS. 5A and 6A but that, on the other hand, their relative radial dimensions are varied as shown at $m$, $n$, $q$, $r$ and $s$ on FIG. 5B and at $m$, $n$, $q$, $r$, $s$, $t$, $v$ and $y$ on FIG. 6B. Such arrangement may be of advantage, though not necessarily used, in order to ensure a better uniformity of the ohmic resistances of said arcuate or longitudinal conductor portions with respect to their relative lengths. In a modification, such graduation of arcuate conductor width may be so provided as to maintain a substantially uniform ohmic resistance in each turn as the ohmic resistance of the radial conductors varies from turn to turn, or to provide any desired law of variation of these ohmic resistances of turns, as the case may be.

But, as said, the invention is not at all restricted to the application to conductors of uniform flare throughout their radial length. Such graphs as those in FIGS. 3 and 4 may be established for several radii with variations of the ideal waveform at each of the said radii and, consequently, variations of the spans determined for the conductors at said radii. From a set of such varied graphs, the shapes of conductors may be so determined as to vary the distribution of the resulting magnetic field in sectoral areas of the polar areas between different pairs of radii: either the axis of each thus shaped conductor will be preserved radial, in which case the conductors may not remain contiguous, or the conductors will be preserved contiguous, each group starting for instance (for each pole) from a radial line.

It is now quite clear from the above that the invention enables any shaping of magnetic field and flux in polar areas of the concerned machines as may be desired, by the mere shaping of portions of the flat conductors of the inductor windings in accordance with a method of predetermination of these shapes which ensures a fair approximation of the desired shaping of field and flux.

I claim:

1. A multipolar winding for establishing multiple magnetic poles spaced apart along a pole distribution axis in an electric machine, said winding comprising an insulating carrier member extending along said pole distribution axis, a flat conductor intimately secured on one broad face thereof to said carrier member and forming single-larger multi-turn coils surrounding said pole areas, said coils being formed of transverse conductor portions arranged in groups between said pole areas respectively and extending transversely of said pole distribution axis, and groups of longitudinal conductor portions arranged parallel with said pole distribution axis and connecting the ends of conductor portions of one transverse group with the ends of conductor portions in an adjacent group of transverse portions, each coil having an axis of symmetry passing through the center of its pole area transversely of said pole distribution axis, and the transverse conductor portions on each coil having different widths which vary symmetrically on opposite sides of said axis of symmetry, to produce a predetermined magnetic field distribution in each pole area.

2. A winding according to claim 1, wherein said longitudinal conductor portions have their widths varied to provide a substantially uniform ohmic resistance for each turn of the coil.

3. A winding as in claim 1, wherein said carrier member comprises an insulating ring for an axial airgap machine, said transverse conductor portions being of radial orientation and said longitudinal conductor portions being of circular orientation, and said transverse conductor portions being contiguous and of substantially sectoral shapes.

4. A winding according to claim 3, wherein the said longitudinal conductor portions are of varied radial width in each group.

5. A winding according to claim 1, wherein said carrier member comprises an insulating ring for an axial airgap machine, said transverse conductor portions being of general radial orientation and said longitudinal conductor portions being of circular group orientation, and said transverse conductor portions being contiguous and symmetrically distributed in each group with respect to a radial axis of symmetry in said group.

6. A winding according to claim 5, wherein said longitudinal conductor portions are of varied radial width in each group.

7. A winding according to claim 1, wherein in each transverse conductor group two sets of conductor portions are provided symmetrically with respect to an axis of symmetry of the group and in each set of transverse conductor portions at least the widths of the conductors are varied in definite relative ratios.

8. A winding as in claim 7, wherein said relative ratios are varied along the lengths of the said transverse conductor portions.

9. A winding according to claim 1 wherein the widths of the transverse conductor portions are varied in accordance with a graphic analysis of the desired magnetic field waveform to obtain a stepped function having as many steps as there are conductors in one-half of the conductors in each group.

References Cited by the Examiner
UNITED STATES PATENTS

| | | | |
|---|---|---|---|
| 2,683,232 | 7/1954 | Weissheimer | 310—268 |
| 2,773,239 | 12/1956 | Parker. | |
| 2,880,335 | 8/1958 | Dexter | 310—268 |
| 2,920,574 | 1/1960 | Sampietro | 310—268 |
| 3,036,248 | 5/1962 | Nellist | 310—268 X |
| 3,097,319 | 7/1963 | Baudot | 310—268 X |

ORIS L. RADER, *Primary Examiner.*

MILTON O. HIRSHFIELD, *Examiner.*

UNITED STATES PATENT OFFICE
CERTIFICATE OF CORRECTION

Patent No. 3,231,773                 January 25, 1966

Jacques Henry-Baudot

It is hereby certified that error appears in the above numbered patent requiring correction and that the said Letters Patent should read as corrected below.

Column 3, line 52, for "transfer" read -- transverse --; column 4, line 50, for "larger" read -- layer --.

Signed and sealed this 3rd day of January 1967.

(SEAL)
Attest:

ERNEST W. SWIDER
Attesting Officer

EDWARD J. BRENNER
Commissioner of Patents